United States Patent Office 2,765,346
Patented Oct. 2, 1956

2,765,346

ALCOHOLS BY BOROHYDRIDE REDUCTION OF ESTERS

Raymond Etienne Paul, Versailles, and Paul Jean Clement Buisson and Nicole Marie Joseph, Paris, France, assignors to Societe des Usines Chimiques Rhone-Poulenc, Paris, France, a body corporate of France No Drawing. Application June 4, 1952,
Serial No. 291,778

Claims priority, application France June 30, 1951

12 Claims. (Cl. 260—621)

This invention relates to a process for the preparation of alcohols and more particularly to the preparation of alcohols by reduction of carboxylic acid esters.

Since it was first proposed to reduce carboxylic acid esters to the alcohols by means of metallic sodium and an alcohol, various other reducing agents have been suggested for this purpose. In particular, it has been shown by Nystrom, Chaikin and Brown (J. A. C. S., 71, p. 3245 (1949)) that lithium borohydride under the action of heat can be used for this reduction but it is also apparent from the information available, see for example Chaikin and Brown, ibid., p. 122, that, of the alkali metal borohydrides, the lithium compound is specific in this respect. However, lithium borohydride is an expensive product which is difficult to prepare whereas sodium and potassium borohydride, especially the latter, on the other hand, are cheaper and more readily available.

We have now found that sodium and potassium borohydride can be successfully used for this reaction in the manner hereinafter described, thus avoiding the necessity for preparing lithium borohydride.

Accordingly, the present invention provides a process for the preparation of an alcohol by reduction of a carboxylic acid ester which comprises reducing the said ester by means of potassium borohydride or sodium borohydride together with a substantially stoichiometrically equivalent proportion of lithium chloride, bromide, iodide, sulphate or nitrate.

It is usually preferred to use potassium borohydride in the process of this invention since it is easier to make, and usually gives substantially better results, than sodium borohydride. The invention is especially advantageous when applied to the production of aliphatic and araliphatic alcohols. The yields of the alcohols obtained by the process vary with the lithium salt employed; by way of illustration, the chloride gives excellent yields, which in some cases approach the theoretical, whereas the bromide and sulphate have generally been found to be substantially less advantageous. It is to be noted in this connection that lithium compounds, other than those specified in the last preceding paragraph and in particular the carbonate, phosphate, fluoride and hydroxide, give no yield, or at most only very small yields, of the alcohols under the same conditions.

The ester to be reduced is preferably dissolved in an organic solvent which must naturally be inert with respect to the borohydride. Tetrahydrofurane, dioxane and glycol formal are particularly suitable, while the hydroxylic solvents generally do not give such good results.

The preferred method of operation consists in adding the lithium salt (preferably the chloride, iodide or nitrate) in finely powdered form to a suspension of potassium borohydride in the solution of the ester to be reduced. The reaction, which is exothermic, starts spontaneously at room temperature, i. e. at a temperature below 40° C.—but it is usually advantageous to heat the reaction mixture for a period of time in order to ensure completion and, therefore, maximum yield of alcohol.

The invention is illustrated by the following examples:

*Example I*

12 g. of technical potassium borohydride (93%) are added to a solution of 30 g. of ethyl benzoate in 120 cc. of anhydrous tetrahydrofurane. On the addition of 10 g. of finely powdered lithium chloride, an exothermic reaction commences which is accompanied by an evolution of gas. The reaction is completed by heating the mixture for 4 hours on a water bath. After cooling, the product is taken up in water, extracted with ether and dried; the solvents are evaporated and the residue is distilled.

19 g. of pure benzyl alcohol are obtained, representing a yield of 88%.

*Example II*

By proceeding as in Example I, but replacing the tetrahydrofurane by dioxane, the yield of benzyl alcohol is 90%.

*Example III*

By proceeding as in Example I, but replacing the ethyl benzoate by butyl stearate, n-octadecanol is obtained, representing a yield of 91%.

*Example IV*

By proceeding as in Example I, but starting with ethyl β-(α-tetrahydrofuryl) propionate, there is obtained propyl β-(α-tetrahydrofuryl) alcohol in a yield of 75%.

*Example V*

By proceeding as in Example I, ethyl undecylenate can be reduced to undecylenic alcohol with a yield of 77%.

*Example VI*

20 g. of ethyl para-nitrobenzoate dissolved in 60 cc. of tetra-hydrofurane, 6 g. of potassium borohydride and 4.7 g. of powdered lithium chloride, are introduced with agitation into a three-necked spherical flask provided with an agitator and thermometer and supplied with a cooling fluid. The agitation is maintained for 7½ hours. The temperature passes through a maximum after 10 minutes and the mixture progressively thickens. 100 cc. of water are then added, with continued agitation, the mixture is decanted, extracted with ether and dried and the solvents are evaporated. The crystals obtained are taken up in boiling water. On cooling there is precipitated from the aqueous solution 12 g. of colourless needles of p-nitro-benzyl alcohol melting (capillary tube) at 93.4°–93.6° C., representing a yield of 76.5% of p-nitro-benzyl alcohol. On extraction of the mother solutions with ether, a further 1.4 g. of the alcohol is recovered, which brings the total yield of 86%.

*Example VII*

By operating as in Example VI, but replacing the ethyl para-nitrobenzoate by ethyl cinnamate in the same molecular proportions, a mixture of hydrocinnamic alcohol and cinnamic alcohol is obtained in quantities corresponding to yields of 65% and 8% respectively.

*Example VIII*

By operating as in Example I, but replacing the tetrahydrofurane by glycol formal, there is obtained a yield of 72% of benzyl alcohol.

*Example IX*

By operating as in Example I, but replacing lithium chloride by the corresponding iodide, a yield of 50% of benzyl alcohol is obtained after heating for 4 hours.

Example X

By operating as in Example I, but replacing the chloride by lithium nitrate a 34% reduction of the ester is achieved after 4 hours, a 93% conversion to benzyl alcohol being attained after a total of 12 hours.

We claim:

1. A process for the preparation of an alcohol by reduction of a carboxylic acid ester which comprises reducing the ester by means of an alkali metal borohydride of molecular weight at least 38 and at most 54.1 in admixture with a substantially stoichiometrically equivalent proportion of a member of the class consisting of lithium chloride, iodide, and nitrate.

2. A process for the reduction to alcohol of an aromatic carboxylic acid ester which comprises reacting the ester with an alkali metal borohydride of molecular weight at least 38 and at most 54.1 in admixture with a substantially stoichiometrically equivalent proportion of a member of the class consisting of lithium chloride, iodide, and nitrate.

3. A process for the reduction to alcohol of an aliphatic carboxylic acid ester which comprises reacting the ester with an alkali metal borohydride of molecular weight at least 38 and at most 54.1 in admixture with a substantially stoichiometrically equivalent proportion of a member of the class consisting of lithium chloride, iodide, and nitrate.

4. A process for the production of an araliphatic alcohol which comprises reducing an ester of an aromatic carboxylic acid with potassium borohydride in admixture with a substantially stoichiometrically equivalent proportion of lithium chloride.

5. A process for the production of an aliphatic alcohol which comprises reducing an ester of an aliphatic carboxylic acid with potassium borohydride in admixture with a substantially stoichiometrically equivalent proportion of lithium chloride.

6. A process for the production of an araliphatic alcohol which comprises reducing an ester of an aromatic carboxylic acid with potassium borohydride in admixture with a substantially stoichiometrically equivalent proportion of lithium iodide.

7. A process for the production of an aliphatic alcohol which comprises reducing an ester of an aliphatic carboxylic acid with potassium borohydride in admixture with a substantially stoichiometrically equivalent proportion of lithium iodide.

8. A process for the production of an araliphatic alcohol which comprises reducing an ester of an aromatic carboxylic acid with potassium borohydride in admixture with a substantially stoichiometrically equivalent proportion of lithium nitrate.

9. A process for the production of an aliphatic alcohol which comprises reducing an ester of an aliphatic carboxylic acid with potassium borohydride in admixture with a substantially stoichiometrically equivalent proportion of lithium nitrate.

10. A process for the reduction to alcohol of a carboxylic ester which comprises suspending potassium borohydride in a solution of a carboxylic ester, adding to the suspension finely divided lithium chloride in amount substantially stoichiometrically equivalent to the quantity of borohydride present and on completion of the reaction under heat removing the alcohol thus formed.

11. A process for the reduction to alcohol of an aliphatic carboxylic ester which comprises suspending potassium borohydride in a solution of an aliphatic carboxylic ester, adding to the suspension finely divided lithium chloride in amount substantially stoichiometrically equivalent to the quantity of borohydride present and on completion of the reaction under heat removing the aliphatic alcohol thus formed.

12. A process for the reduction to alcohol of an aromatic carboxylic ester which comprises suspending potassium borohydride in a solution of an aromatic carboxylic ester, adding to the suspension finely divided lithium chloride in amount substantially stoichiometrically equivalent to the quantity of borohydride present and on completion of the reaction under heat removing the araliphatic alcohol thus formed.

References Cited in the file of this patent

UNITED STATES PATENTS

| | | |
|---|---|---|
| 2,534,533 | Schlesinger et al. | Dec. 19, 1950 |
| 2,683,721 | Schlesinger et al. | July 13, 1954 |

OTHER REFERENCES

Nystrom et al.: J. Amer. Chem. Soc., vol. 71, pp. 3245–3246 (September 1949).

Hoekstra et al.: J. Amer. Chem. Soc., vol. 71, pp. 2488–2492 (July 1949).

Schlesinger et al.: "New Developments—Borohydrides" (J. A. C. S.), vol. 75, pp. 212–13; received March 17, 1952.